No. 896,404. PATENTED AUG. 18, 1908.
W. O. LONG.
DUMPING WAGON.
APPLICATION FILED MAY 16, 1906.
3 SHEETS—SHEET 1.
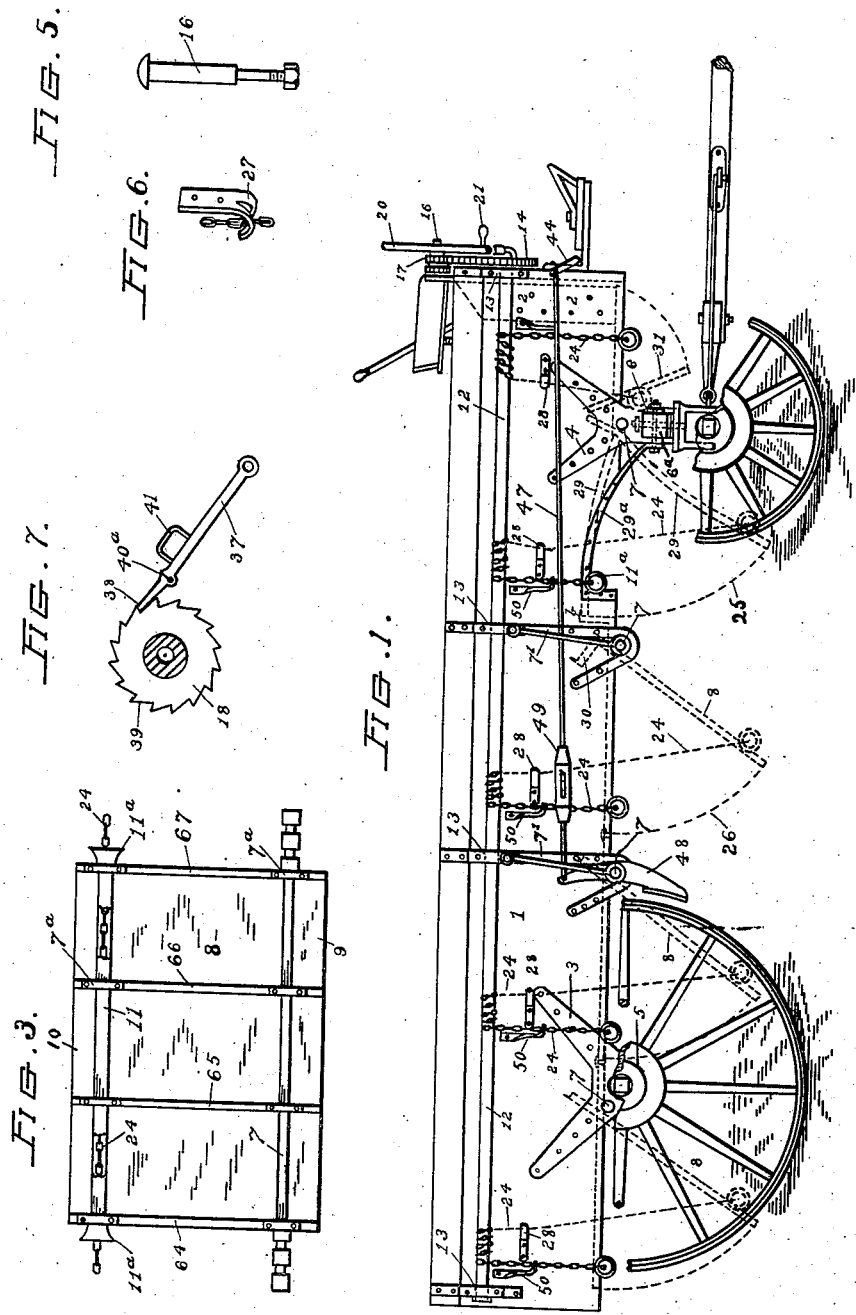
Witnesses
Fred A. Schlosser
Nellie A. Casey
Inventor
Willard O. Long
By John H. Cross
Attorney

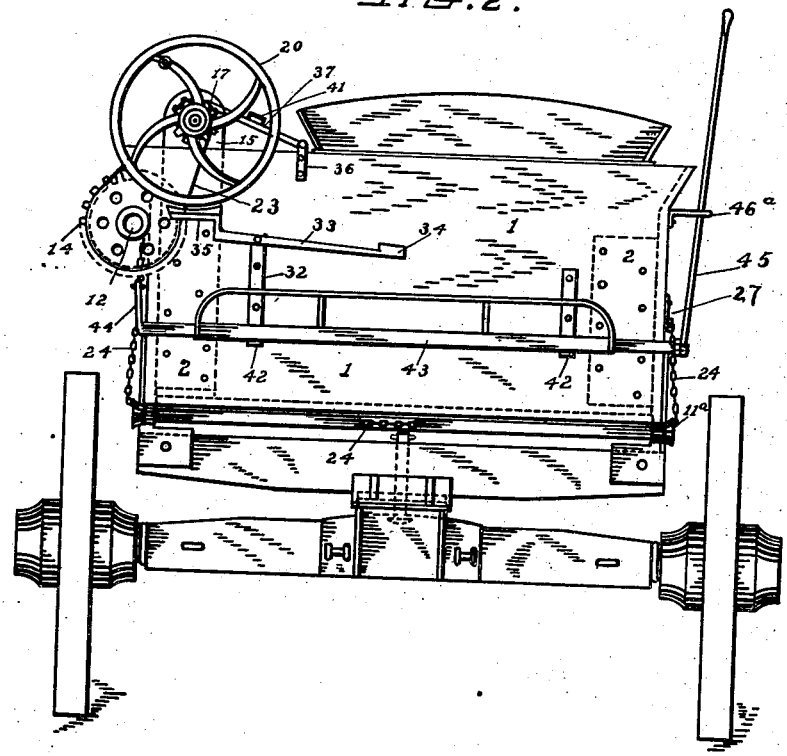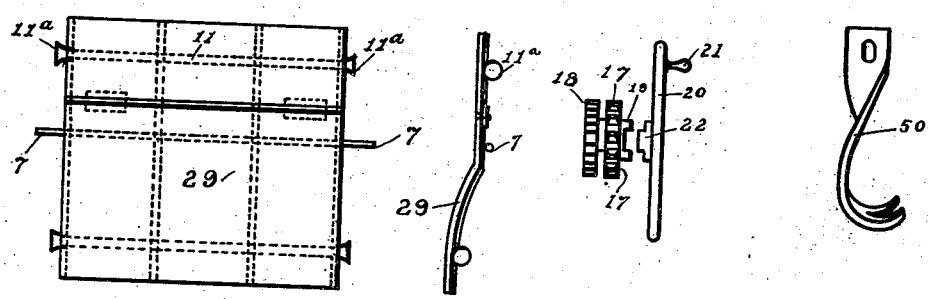

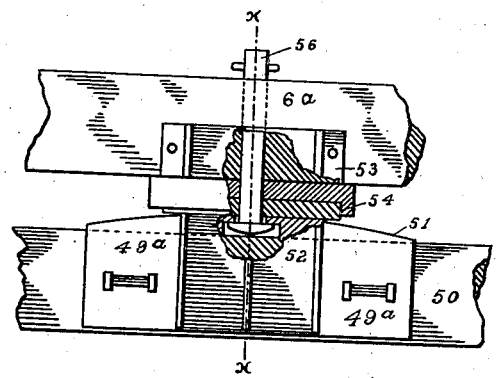
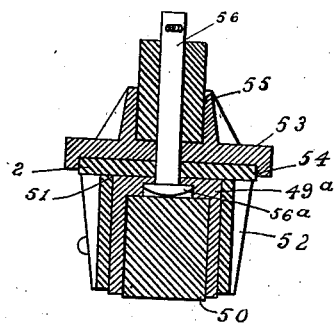
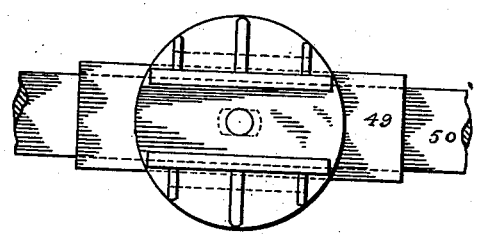
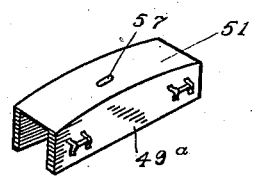
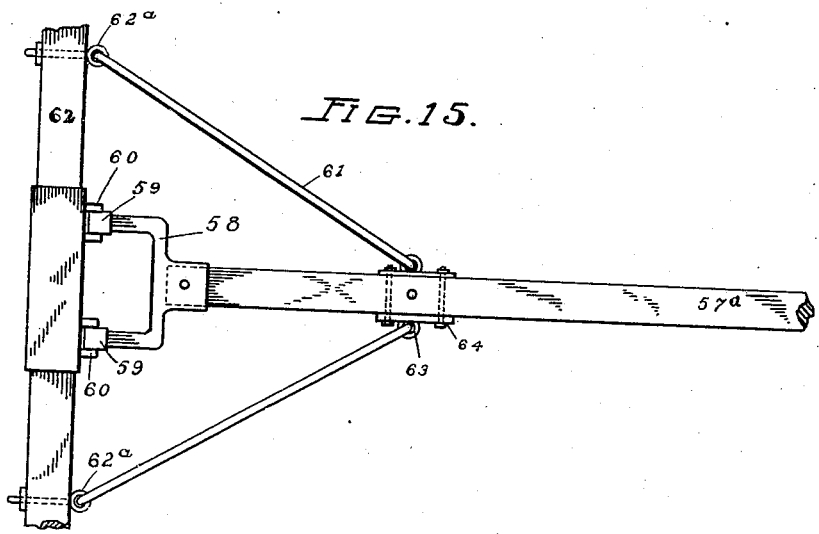

UNITED STATES PATENT OFFICE.

WILLIARD O. LONG, OF MANSFIELD, OHIO.

DUMPING-WAGON.

No. 896,404.      Specification of Letters Patent.      Patented Aug. 18, 1908.

Application filed May 16, 1906. Serial No. 317,062.

*To all whom it may concern:*

Be it known that I, WILLIARD O. LONG, citizen of United States, residing at Mansfield, in the county of Richland and State of Ohio, have invented certain new and useful Improvements in Dumping-Wagons, of which the following is a specification.

My invention relates to dumping wagons which are used to dump or empty the contents of the wagon box through the medium of a sectional bottom consisting of one or more plates mounted on rotatable shafts in such a manner as to permit the plates to be swung or oscillated to open and close the bottom of the wagon box simultaneously or independent of each other.

My invention primarily consists of a series of plates mounted on suitable rotatable shafts having a tube or pipe secured to the lower portion of the plates adjacent to the free ends and operated by a suitable shaft journaled in bearings fastened to one side of the wagon box to which one end of a series of chains is securely attached with the opposite ends passing through the tube or pipe and secured on the opposite side of the wagon box to a hook, the chains being adapted to movably support the free ends of the dumping plates.

A further feature of my device is the method employed to open and close the dumping plates gradually to provide for dumping the whole of the contents of the box at one place or gradually spread the contents of the box over more or less surface at the will of the operator.

A further object of my invention is to provide means of retaining the dumping plates at any position in the operation of opening or closing the dumping plates.

A further feature of my invention is the use of a novel fifth-wheel, and a method of hitching the pole or tongue to the axle to be used in conjunction with the dumping mechanism of the wagon.

A further object of my device is to provide a means of constructing an ordinary "wheel-house" in connection with the dumping mechanism to afford facilities for making short turns.

I attain these and other objects by the mechanism illustrated in the accompanying drawings in which Figure 1 is a side elevation of my invention showing the operating mechanism with the dumping plates comprising the bottom in open position. Fig. 2 is an end elevation of Fig. 1 showing the sprocket chain mechanism jointed stop-pawl, and brake mechanism. Fig. 3 is a bottom view of one of the series of dumping plates with a portion of the tubular support broken away showing the chain passing through said support, also view of one rotating shaft. Fig. 4 is an end elevation of the operating wheel, clutch, sprocket wheel, and ratchet wheel. Fig. 5 is a plan view of the collar bolt upon which the mechanism described in Fig. 4 is mounted. Fig. 6 is a perspective plan view of a bifurcated hook showing method of securing the free end of the chain thereto. Fig. 7 is a detail end view of the jointed stop-pawl and ratchet-wheel showing method of positively locking the plates at any position desired. Figs. 8 and 9 are edge and top views, respectively, showing the curvature of the dumping plate adapted to conform to the bottom of the wagon box forming what is designated a "wheel house." Fig. 10 is a plan view of a hook which is pivotally secured to or mounted to the body at such a relative position as to permit it to mesh with the links of the chain or chains to permit one or more sections of the dumping plates to be retained in position while the balance are dumped. Fig. 11 is an end elevation of the fifth-wheel showing the bolster and front axle broken away. Fig. 12 is a cross-sectional end view of Fig. 11 taken through the line X X. Fig. 13 is a bottom view of Fig. 11. Fig. 14 is a perspective plan view of the fifth-wheel rocker plate. Fig. 15 is a top plan view of the tongue showing novel method of attaching it to the front axle.

Referring to the drawing reference numeral 1 designates a wagon box having angular corner plates 2 secured to the inner surface of each corner of the wagon box for the purpose of rigidly securing the frame of the wagon box together and to resist any undue strain that the box might be subjected to in its use.

To each side of the wagon box braces or brackets 3 and 4 are secured by any ordinary fastening means, leaving the ends of the braces or brackets terminating in slotted bearings 5 and 6 which fit over the bolsters $6^a$ and support the wagon box. Shafts 7 are rotatably journaled in the hangers $7^1$ and brackets 3 and 4 at right angles to the wagon box.

A series of dumping plates 8 are rotatably secured to the shafts 7 by the bearings 7ª adjacent to one end 9 of the dumping plates as shown in Fig. 3 which permits the dumping plates 8 to drop by gravity when a rotary movement is imparted to the shafts 7 by the mechanism hereinafter described. Adjacent to the opposite end 10, pipes or other similar tubular supports 11 are secured to the dumping plates leaving both ends projecting beyond the sides of the dumping plates and wagon box with each end 11ª terminating in a bell shape.

On one side of the wagon box a longitudinal shaft 12 is journaled in suitable bearings 13. To the longitudinal shaft 12 a sprocket-wheel 14 is rigidly keyed. The corner plate 2 on the left side (see Fig. 2) is extended upward to form a bracket 15 to which the collar bolt or shaft 16 is secured extending forward parallel with shaft 12.

A combined sprocket-wheel 17 and ratchet-wheel 18 with one half of a clutch 19 made integral therewith is journaled on the collar bolt 16. An operating wheel 20 provided with an operating handle 21 is keyed to the collar bolt 16. The hub of the operating wheel 20 is provided with one-half of a clutch 22 and is adapted to mesh with the other half 19 of the clutch.

When the operating-wheel 20 is turned by the operating handle a rotary motion is imparted to the sprocket wheel 17 which through the medium of the sprocket chain 23 imparts a rotary motion to the shaft 12. The shaft 12 is adapted to be rotated in either direction.

One end of the ordinary link-chains 24 are securely attached to the shaft 12 and when the shaft is rotated a sufficient amount of slack chain is unwound from the shaft to permit the dumping plates to be opened to full position as shown. The sweep of the dumping plates is shown by the dotted lines 25 and 26. The opposite ends of the link-chains are dropped down from the shaft 12 and the ends passed through the tube or pipe supports of the dumping plates and secured to the chain bifurcated hook supports 27.

The chains support and suspend each of the dumping plates at any position to provide means to open or close the plates to dump the full load at one time and place or drop it gradually over a pre-determined surface of ground.

A guide 28 is secured to the side of the wagon box at such a relative position as will permit it to contact with the depending portion of the chain so as to insure the chain winding around the shaft 12 in the same direction and to prevent it from overlapping as it is wound or unwound from the shaft. The front dumping plate has a curved portion 29 to conform to the curvature of the wagon box which provides a means of permitting the wagon wheels to be turned under the wagon box in the wheel house affording facilities for making a short turn if it is desired to do so.

The end 30 of the next succeeding plate is turned at a right angle to the body portion with its end (b) adapted to overlap the end of the curved plate as shown in Fig. 1. The front dumping plate is formed in two parts. The rear part 29 is curved or bent as described to conform to the shape of the auxiliary brace 29ª and the front part 31 is made straight and hinged to the curved portion. This provides complete protection for the front axle and bolster and permits the hinged dumping plate to be fully closed or opened without coming in contact with the tongue as the part 31 raises when the part 29 reaches a predetermined position in its descent. The front part 31 is opened or closed in the same manner as the rear part or next succeeding dumping plates, except that it has about one half the distance to travel in opening or closing and a shorter chain is used.

When the shaft 12 is rotated to dump the contents of the wagon box the rear dumping plates are partially opened when the part 31 is fully opened. The short chain which supports the part 31 is secured in the same manner to the shaft 12 as the other chains, except when it is unwound and the part 31 reaches its full open position the chain starts to wind up in the opposite direction which takes up the slack in the chain which might otherwise interfere with the mechanism secured to the front portion of the dumping wagon.

When the shaft 12 is rotated in the direction to close the bottom the slack is fully taken up in the short chain and as the rear or next succeeding plates are raised to half closed position the part 31 commences to close and closes simultaneously with the balance of the plates.

In order to provide a means of gradually dumping the plates I provide an upright bracket 32 to which a brake 33 is pivotally secured having a stirrup 34 secured to one end with the opposite end 35 adapted to contact with the periphery of the wheel 20 which by frictional contact exerted more or less by the operator through the brake permits the plates to drop at the will of the operator. This provides for holding the dumping plates at any position, so that the contents of the wagon box can be dumped at any time or place or gradually spread over a predetermined surface of ground.

In order to provide a means of positively locking the dumping plates at any position I secure an upright standard 36 to the front portion of the wagon box and pivotally attach a jointed stop-pawl 37 thereto. The end of the pawl is adapted to mesh with the serrations 39 of the ratchet wheel 18.

The joint 40ª of the pawl is made to drop slightly below the center to keep the pawl in mesh with the serrations of the ratchet wheel and prevent it from jarring out of mesh therewith.

When it is necessary to drop the contents of the wagon more or less, the operator lifts the jointed stop-pawl by the handle 41, permitting the pawl 38 to drop out of mesh with the serrations of the ratchet wheel which permits the shaft 12 to rotate and open the series of plates forming the bottom of the wagon box.

The ratchet wheel and pawl provides a means of holding the plates positively at any point of their travel in opening and closing.

To the front of the wagon box bearings 42 are securely attached into which a rock shaft 43 is journaled having a short lever 44 secured to one end or made integral therewith. An operating lever 45 is secured to the opposite end and held in place by the bracket 46ª. To the lever 44 a brake rod 47 is secured with its opposite end secured to one end of a brake 48 which is pivotally journaled on the projecting end of one of the shafts 7. The rod 47 is made in two parts and is connected together by a turn buckle 49 which provides for the adjustment of the brake. Channel bars 64—65—66 and 67 are riveted to the bottom of the dumping plate to brace the plates. The bearings 7ª are fitted to the channel portion of the bars.

In the construction of my dumping wagon I use in conjunction therewith a fifth-wheel which is constructed as follows:—A channel box support 49ª is fitted over the axle 50 and provided with a rounded portion 51. A cap 52 is fitted to rock on the rounded portion of the channel box support. To the upper circular portion of the cap a standard 53 is secured with the lower portion 54 formed in cup shape and depending and fitting the circular portion of the cap 52. The upper portion is provided with a longitudinal groove 55 into which the bolster 6ª is fitted to support the wagon box. The king bolt 56 passes through all of the above described parts leaving the collared end 56ª resting on top of the axle. The aperture 57 formed in channel box support 49ª and through which the king bolt passes is made elongated which permits lateral movement of the bolt 56 to conform to the rocking motion of the cap upon the rounded portion 51 of the channel box support. A pole or tongue 57ª is provided with a yoke 58 having half bearings 59 on each end and adapted to fit the journals 60. The tongue is held in place through the medium of two braces 61 which are attached to the axle 62 by the eye bolts 62ª with the opposite ends inserted in the aperture 63 formed on each side of the bracket 64.

The hook shown in Fig. 10 is pivotally attached to the side of the wagon box upon which the rotatable shaft 12 is secured and is adapted to be brought in mesh with one or more of the chains wound on the shaft 12. The chain or chains is then unfastened from the shaft 12 and the hook supports the plates in connection with the chains so that when the shaft 12 is rotated to dump the remaining plates, it imparts no movement to the plates suspended on the chain or chains supported by the hook.

Having fully described my invention, what I claim and desire to secure by Letters Patent is,—

1. In a dumping wagon, a series of rotatable shafts journaled in the lower portion of the wagon box, a plurality of plates secured to said shafts, tubular supports secured to the free ends of said dumping plates, a longitudinal shaft secured to one side of the wagon box, chains secured thereto with one end of said chains passing through the tubular support, a bifurcated hook secured to the opposite side of the wagon box movably supporting and suspending the plates.

2. In a dumping wagon comprising a sectional bottom, a series of brackets with bearings secured to each side of the wagon bed, shafts secured in said bearings, a plurality of plates movably mounted on said shafts, a tube or pipe rigidly secured to the free ends of the plates, a longitudinal shaft journaled in bearings attached to the wagon box, chains secured to said longitudinal shaft with opposite end passing through the tubular support, a bifurcated hook adapted to support the free ends of the chains whereby the plates are movably suspended, means to rotate the longitudinal shaft to open or close the bottom of the bed.

3. A wagon provided with a series of plates, a series of shafts rotatably secured to the under portion of the wagon bed upon which said plates are mounted, one of said plates made in two parts and hinged together, a shaft journaled in bearings secured to the wagon bed, chains secured to said shaft, tubular supports, hooks secured to one side of the wagon box and adapted to support the free ends of the dumping plates, means to oscillate said plates to open and close the bottom of the wagon box.

4. In a dumping wagon, a series of rotatable shafts journaled in the lower portion of the wagon bed, plates journaled on said shafts adjacent to one end, tubular supports secured to the opposite ends, a shaft journaled to the wagon box parallel therewith, chains fastened to said shaft and adapted to be wound and unwound thereon, a sprocket-wheel keyed to said parallel shaft, angular corner irons, a shaft secured to the extending portion of one of said irons, a combined sprocket and ratchet wheel rigidly secured to said shaft with one half of a clutch formed on the hub and adapted to mesh with the other half of the clutch, a sprocket chain.

5. In a dumping wagon, a series of rotatable shafts journaled to the bottom of the wagon, a plurality of plates secured to said shaft with one of said plates made in two parts with the rear part curved, tubular supports secured to the free ends of said plates adjacent to one end, a shaft journaled in bearings to the side of the wagon box, chains secured to said shaft at one end and adapted to be wound thereon with the opposite end passing through the tubular supports, hooks to support the free ends of said chains.

6. In a dumping wagon comprising a sectional bottom and means to open and close said bottom through the medium of rotatable shafts secured to the wagon bed at right angles therewith, a shaft secured to the side of the wagon bed, a sprocket wheel keyed to the end of the shaft and secured to the side of the wagon bed, a bracket attached to the front of the wagon box, a shaft secured to said bracket, a sprocket wheel mounted on said shaft, a sprocket chain adapted to travel over said sprocket wheels, an operating wheel journaled on the shaft secured to the bracket.

7. In a dumping wagon, a series of rotatable shafts secured to the bottom of the wagon bed, a shaft secured to the side of the wagon box at right angles with the rotatable shafts, dumping plates secured to said rotatable shafts one of said plates having one end turned at right angles with the surface and another of said plates curved to form a wheel house both being adapted to overlap each other when the plates are closed.

8. In a dumping wagon comprising a plurality of plates mounted on a series of rotatable shafts journaled in bearings secured to the bottom of the wagon bed, a longitudinal shaft secured to the side of the wagon bed, chains fastened to said longitudinal shaft, one end of said chains secured to a bifurcated hook on the opposite side of the box and supporting said plates.

In testimony whereof I affix my signature in presence of two witnesses.

WILLIARD O. LONG.

Witnesses:
  JOHN H. COSS,
  PHILIP ACKERMAN.